United States Patent
Godin

(10) Patent No.: US 9,877,211 B2
(45) Date of Patent: Jan. 23, 2018

(54) DYNAMIC MANAGEMENT OF AN ON/OFF STATUS OF A BASE STATION FROM A ROUTING PROXY

(71) Applicant: Alcatel Lucent, Boulogne Billancourt (FR)

(72) Inventor: Philippe Godin, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 214 days.

(21) Appl. No.: 14/416,822

(22) PCT Filed: Jun. 28, 2013

(86) PCT No.: PCT/EP2013/063617
§ 371 (c)(1),
(2) Date: Jan. 23, 2015

(87) PCT Pub. No.: WO2014/019777
PCT Pub. Date: Feb. 6, 2014

(65) Prior Publication Data
US 2015/0181445 A1    Jun. 25, 2015

(30) Foreign Application Priority Data

Jul. 31, 2012 (EP) .................... 12178663

(51) Int. Cl.
*H04L 12/28* (2006.01)
*H04W 4/00* (2009.01)
*H04B 7/14* (2006.01)
*H04W 24/04* (2009.01)
(Continued)

(52) U.S. Cl.
CPC ......... *H04W 24/04* (2013.01); *H04W 76/062* (2013.01); *H04W 84/045* (2013.01); *H04W 92/045* (2013.01)

(58) Field of Classification Search
CPC . H04W 24/04; H04W 76/062; H04W 92/045; H04W 84/045
See application file for complete search history.

(56) References Cited

U.S. PATENT DOCUMENTS

| 7,006,433 B1 | 2/2006 | Dantu et al. |
| 2009/0207855 A1 | 8/2009 | Watanabe |

(Continued)

FOREIGN PATENT DOCUMENTS

| EP | 2 148 549 A1 | 1/2010 |
| WO | WO 2011/021975 | 2/2011 |

(Continued)

OTHER PUBLICATIONS

New Postcom, "Discussion of enhanced mobility solutions between MeNB and HeNB", 3GPP TSG-RAN WG3 AH Meeting, R3-101850, Jun. 23, 2010.

(Continued)

*Primary Examiner* — Kiet Tang
(74) *Attorney, Agent, or Firm* — Fay Sharpe, LLP

(57) ABSTRACT

The application relates to the problem that when an HeNB switches off (HeNB1-3) while connected via a proxy (PR) as mentioned by Release 11 of 3GPP TR 37.803 to a peer X2AP entity, the X2AP entity in the HeNB can not inform its peer (eNB1) that it is no longer reachable. The problem is solved in that when the proxy detects the disconnection of the SCTP connection (SCT-P1-3) between the HeNB and itself, it transmits an X2AP STOP message to the eNB (eNB1), whereby this message indicates the end of the SCTP connection (SCTP1-3) and identifies the HeNB.

11 Claims, 6 Drawing Sheets

(51) Int. Cl.
*H04W 76/06* (2009.01)
*H04W 84/04* (2009.01)
*H04W 92/04* (2009.01)

(56) References Cited

U.S. PATENT DOCUMENTS

| | | | | |
|---|---|---|---|---|
| 2010/0322146 | A1* | 12/2010 | Liu | H04B 7/155 370/315 |
| 2011/0044284 | A1* | 2/2011 | Voltolina | H04W 24/02 370/331 |
| 2011/0075633 | A1* | 3/2011 | Johansson | H04W 36/02 370/331 |
| 2011/0243097 | A1* | 10/2011 | Lindqvist | H04W 24/02 370/331 |
| 2013/0053024 | A1 | 2/2013 | Zou et al. | |

FOREIGN PATENT DOCUMENTS

| WO | WO 2011/022613 A1 | 2/2011 |
|---|---|---|
| WO | WO 2011/134401 | 11/2011 |

OTHER PUBLICATIONS

Ericsson, Alcatel-Lucent, "SCTP Concentrator: A Simple Solution to a Debated Problem", 3GPP TSG-RAN WG3 #75, R3-120321, Jan. 31, 2012.

"3$^{rd}$ Generation Partnership Project; Technical Specification Group Radio Access Network; Universal Mobile Telecommunications System (UMTS) and LTE: Mobility enhancements for Home Node B (HNB) and Home enhanced Node B (HeNB) (Release 11)," 3GPP TR 37.803 V11.0.0, XP050581186, pp. 1-120, (Jun. 2012).

"3$^{rd}$ Generation Partnership Project; Technical Specification Group Radio Access Network; Evolved Universal Terrestrial Radio Access Network (E-UTRAN); X2 application protocol (X2AP) (Release 11)," 3GPP TS 36.423 V11.1.0, XP050581157, pp. 1-134, (Jun. 2012).

Alcatel Lucent, "Full X2 proxy SCTP association issues," 3$^{rd}$ Generation Partnership Project (3GPP), 3GPP TSG-RAN3 Meeting #76, R3-121043, XP050611190, pp. 1-5, Prague, May 21-25, 2012.

International Search Report for PCT/EP2013/063617 dated Aug. 13, 2013.

* cited by examiner

DYNAMIC MANAGEMENT OF AN ON/OFF STATUS OF A BASE STATION FROM A ROUTING PROXY

TECHNICAL FIELD

This invention involves the LTE telecommunication network field comprising node B which could be easily switching off or disconnecting without scoring the network quality of service. Especially, the present invention relates to a method allowing warning nearby equipments, such as evolved node B (eNB), of an home evolved node B disconnection from an E-UTRAN network, an home evolved node B being called HeNB and it is also called femto cell.

BACKGROUND TECHNOLOGY

Mobile telecommunications networks enable users of User Equipment (UE) to communicate with other such users via one of a number of nodes B (NB) and a core network.

In the recent developments of mobile network infrastructure, new protocols were necessary in order to support dense deployments of telecommunication equipment and the increasing number of users.

In that context, LTE is a standard for wireless communication of high-speed data for mobile phones and data terminals. It is based on the GSM/EDGE and UMTS/HSPA network technologies, increasing the capacity and speed using new modulation techniques. The standard is developed by the 3GPP (3rd Generation Partnership Project) and is meanly specified in its Release 8 document series.

e-UTRAN is the radio access network of 3GPP's Long Term Evolution mobile networks. It is the abbreviation for "evolved UMTS Terrestrial Radio Access Network", also referred to as the 3GPP work item on the Long Term Evolution, called LTE, also known as the "Evolved Universal Terrestrial Radio Access" whose acronym is E-UTRA.

Under the 3GPP standards, a UTRAN base station is referred to as a Node B and an E-UTRAN base station is referred to as an eNode B or eNB.

A "Node B" corresponds to a base transceiver station also known as BTS used in the GSM network. Node B can be noted as NB in the following description.

The FIG. 1 describes an e-UTRAN architecture where an eNB allows aggregating data communications from user's equipment UE to the core network through downstream and upstream links 1 via switches SW. The switch can be a mobility management entity noted MME and especially a MME/S-GW when it is used as a gateway to the core network.

FIG. 1 illustrates an architecture where eNB allow horizontal links between each other.

The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface. The S1 interface supports a many-to-many relation between MMEs/Serving Gateways and eNBs.

Recently the 3GPP standards body has adopted an official architecture and started work on a new standard for home base stations. Where the home base station is operating in accordance with the LTE standards, the Home Base Station is sometimes referred to as an HeNB. A similar architecture will also be applied in the WiMAX network. In this case, the home evolved node B is commonly referred to as a femto cell.

For simplicity, the present application will use the term HeNB to refer to any such home base station. The HeNB will typically provide radio coverage (for example, 3 G/4 G/WiMAX) within the home but may also be used in an enterprise, a mall, or outdoor. It will connect to the core network via a suitable public network (for example via an ADSL link to the Internet) and in the case of the 3GPP standards, via an optional HeNB gateway (HNB-GW) which typically will aggregate traffic from several HeNBs.

In the following description, different eNB types are discussed:

Macro-eNB is used as a synonym for any eNB deployed and maintained by the operator based on its own requirements.

Home eNB, called HeNB, is best described as a Pico eNB of only one cell which, when at home, is typically installed by the end-user and has lower transmit power. The HeNB possibly only requires a subset of the operations and maintenance functionality required for the Macro-eNBs. The Home eNB may be deployed on the same frequency layer as the macro cell, as well as a different layer, and may also be restricted to only a closed user group.

FIG. 2 illustrates a typical E-UTRAN architecture comprising:

switch as referred as MME/S-GW to access to the core network;

eNB allowing:
  connections with the switches via S1 interface;
  connections with other eNB via X2 interface.

HeNB allowing local deployment of mobile access to the network, the HeNB comprising:
  connections with the switches via S1 interface, for example with specific switches, noted HeNB GW, in order to access to the core network;
  connections with others HeNB via X2 interface.

In the scenario of dense deployment of HeNBs, the number of HeNB neighbors to a macro eNB may become large, several hundred for instance.

The X2AP protocol is used to handle the UE (User Equipment) mobility within e-UTRAN and provides especially the following functions:
  Mobility Management;
  Load Management;
  Reporting of General Error Situations;
  Resetting the X2;
  Setting up the X2;
  eNB Configuration Update.

X2AP acronyms means "X2 Application Protocol". The X2AP protocol is implemented over the X2 interface. The main functions of X2 interface layer 1 are as following:
  Interface to physical medium;
  Frame delineation;
  Line clock extraction capability;
  Transmission quality control;
  Layer 1 alarms extraction and generation.

Drawing and maintaining such number of X2 connections can become challenging for the macro eNB in particular with regards to drawing and maintaining such high number of SCTP associations with its neighbors. In the following description SCTP acronym means "Stream Control Transmission Protocol". It is a transport layer protocol, serving in a similar role to the other transport layer protocols.

This issue is currently being addressed as part of 3GPP Enhanced H(e)NB Mobility Study Item Release 11.

As part of this work, three proxy solutions have been proposed.

The first solution presents the advantage that it works only in SCTP routing protocol and does not interfere with the X2AP solution. The proxy router does not need to terminate X2AP protocol. On the other hand, eNB, HeNB and the proxy have to use a non standardized SCTP which doesn't exist today. All nodes must be modified to be compliant with this solution.

The second solution fully terminates the X2AP protocol in the proxy but presents the advantage to reuse an off-the-shelf standard SCTP. Such a solution presents the inconvenience that a proxy presents high complexity and maintains all X2AP contexts and nodal behavior.

The third solution called "X2 routing proxy" solution presents the advantage that it works on top of existing SCTP also while remaining stateless in terms of termination of the X2AP protocol, i.e. no X2AP contexts stored in the proxy and no X2AP nodal behavior implemented.

However an impediment has been found for this solution when a HeNB switches off. Indeed, there is no means to inform the peer X2AP entity in the macro eNB that this HeNB is no longer reachable. This means that the macro eNB will continue sending X2AP messages and requests expecting an answer that will never come.

No real solution has been presented so far to efficiently tackle this problem. The best existing solution by default is therefore that the macro eNB could detect after multiple triggering of unanswered X2AP class 1 procedures, i.e. procedures for which an answer is expected by the requesting node, that something got wrong on the peer X2AP HeNB.

One inconvenience is that the eNB implementation relies on choices made in the macro eNB implementation which may not have implemented this kind of detection mechanism. Then it does not cover the case of the class 2 procedure, i.e. X2AP procedures for which no answer is expected by the requesting node.

A major drawback of current solutions results from the increased number of undesirable message which saturates the network.

SUMMARY

One object of the invention is to overcome at least some of the inconveniences of the state of the art. Some embodiments of the invention permit to improve decreasing network cluttering and network congestion with suppressing undesirable message and improve data rate optimization.

It is an object of the invention to provide a method performed by at least a proxy router of a LTE telecommunication network comprising at least a first evolved node B and a second evolved node B of a set of evolved nodes B, the first evolved node B being connected to the proxy router via a first SCTP connection and at least the second evolved node B of the set of evolved nodes B being connected to the proxy router via a second SCTP connection, the proxy router allowing an X2AP association between the first and the second evolved nodes B.

The method comprises:
  detecting at the proxy router any disconnection of the first SCTP connexion of the first evolved node B with the proxy router;
  transmitting at least a X2AP STOP message indicating the disconnection of the first SCTP connection by the proxy router to the second evolved node B, the X2AP STOP message comprising data:
    indicating the end of an X2AP association;
    identifying the first evolved node B.

Advantageously, the proxy router transmitting the X2AP STOP message to each evolved node B of the set of evolved nodes B being connected to the proxy router via a SCTP connection.

Advantageously, each evolved node B of the set of evolved nodes B being connected to the proxy router via a SCTP connection performing a final step of the method when receiving a X2AP STOP message from the proxy router comprising:
  stopping triggering any X2AP messages to the disconnected first evolved node B.

Advantageously, the proxy router stores a correspondence table between the IP address of the first evolved node B, the IP address being known by the first SCTP connection and a list of IP addresses of evolved nodes B of the set of evolved nodes B having an X2AP association with the first evolved node B via the proxy router.

Advantageously, the first evolved node B transmitting a X2AP STOP message included in a first container of an X2 setup sequence when a X2AP association is being initiated between the first evolved node B and a second evolved node B.

Advantageously, the first container is stored in a memory of the proxy router and indexed to the correspondence table with the IP address of the first evolved node B when forwarding the setup sequence to the second evolved node B.

Advantageously, the proxy router automatically transmits the first container to at least the second evolved node B of the set of evolved nodes B when detecting the disconnection of the first SCTP connection with the first evolved node B.

Advantageously, the first evolved node B is a low power cellular base station having one cell.

Advantageously, the first evolved node B is a evolved node B comprising:
  only one cell;
  a limited power consumption, i.e. equipment with a power consumption substantially less than 1000 mWatts.

The first evolved node B is a home evolved node B, noted HeNB, also called femto cell.

Advantageously, each evolved node B of the set of evolved nodes B is a evolved node B comprising at least two cells. In a preferred embodiment, each evolved node B of the set of nodes B is an evolved macro-node B, noted eNB.

Furthermore, one other object of the invention concerns a proxy router comprising a memory and being connected in a LTE telecommunication network comprising at least a first evolved node B and a second evolved node B of a set of evolved nodes B, the first evolved node B being connected to the proxy router via a first SCTP connection and at least the second evolved node B of the set of evolved nodes B being connected to the proxy router via a second SCTP connection, the proxy router allowing a X2AP association between the first and the second evolved nodes B, wherein the router allowing:
  detecting any disconnection of the first SCTP connection with the first evolved node B;
  transmitting a X2AP message indicating the disconnection of the first SCTP connection, noted X2AP STOP message, to the second evolved node B, the X2AP STOP message comprising data:
    indicating the end of an X2AP association;
    identifying the first evolved node B.

Advantageously, the X2AP STOP message comprises data identifying the second evolved node B associated to the first evolved node B of the X2AP association between the first and the second evolved nodes B.

Advantageously, the proxy router automatically transmits the corresponding IP address of the first evolved node B to at least the second evolved node B of the set of evolved nodes B when detecting the disconnection of the first SCTP connection with the first evolved node B.

Furthermore, one other object of the invention concerns a first evolved node B allowing generating and transmitting a X2AP STOP message included in a container, the container being included in a X2 setup sequence when a X2AP association is initiated between the first evolved node B and at least a second evolved node B.

Advantageously, the first evolved node B is a home evolved node B, noted HeNB.

BRIEF DESCRIPTION OF THE DRAWINGS

These and other aspects of the invention will be apparent from and elucidated with reference to the embodiments described hereafter with reference being made to the drawings in which.

DETAILED DESCRIPTION

Figure 1:
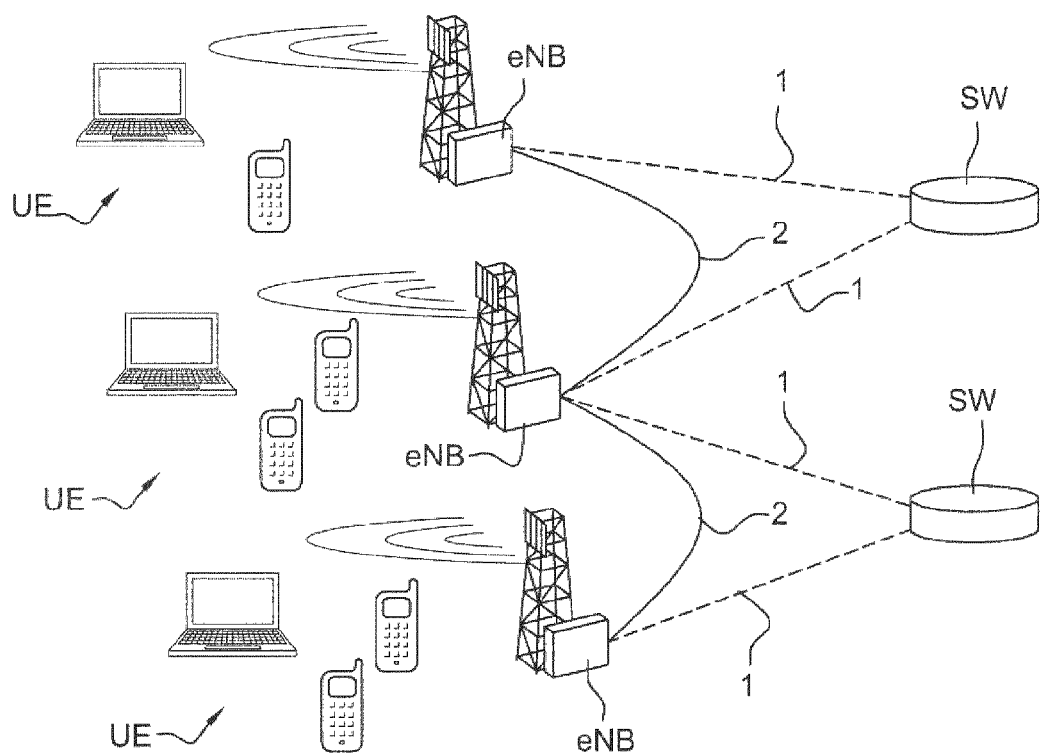
FIG. 1: illustrates one example of an e-UTRAN architecture of a LTE network.
Figure 2:
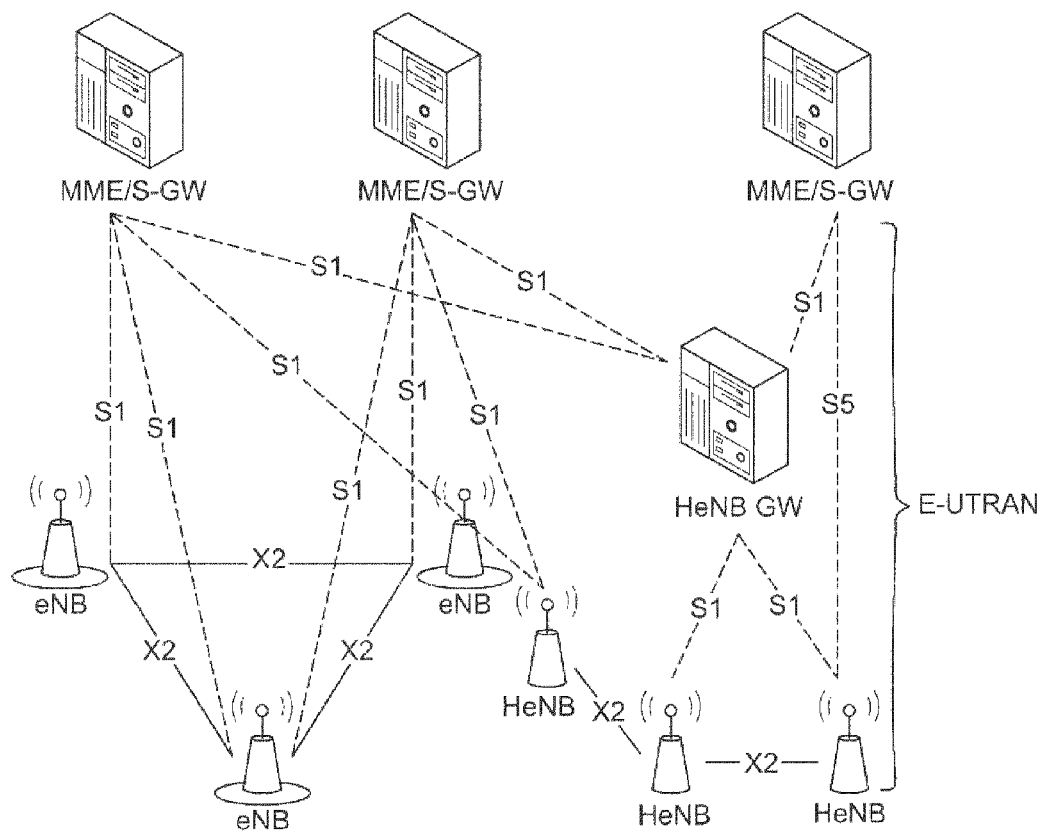
FIG. 2 illustrates an e-UTRAN architecture of a LTE network showing X2 and S1 interfaces.
Figure 3:
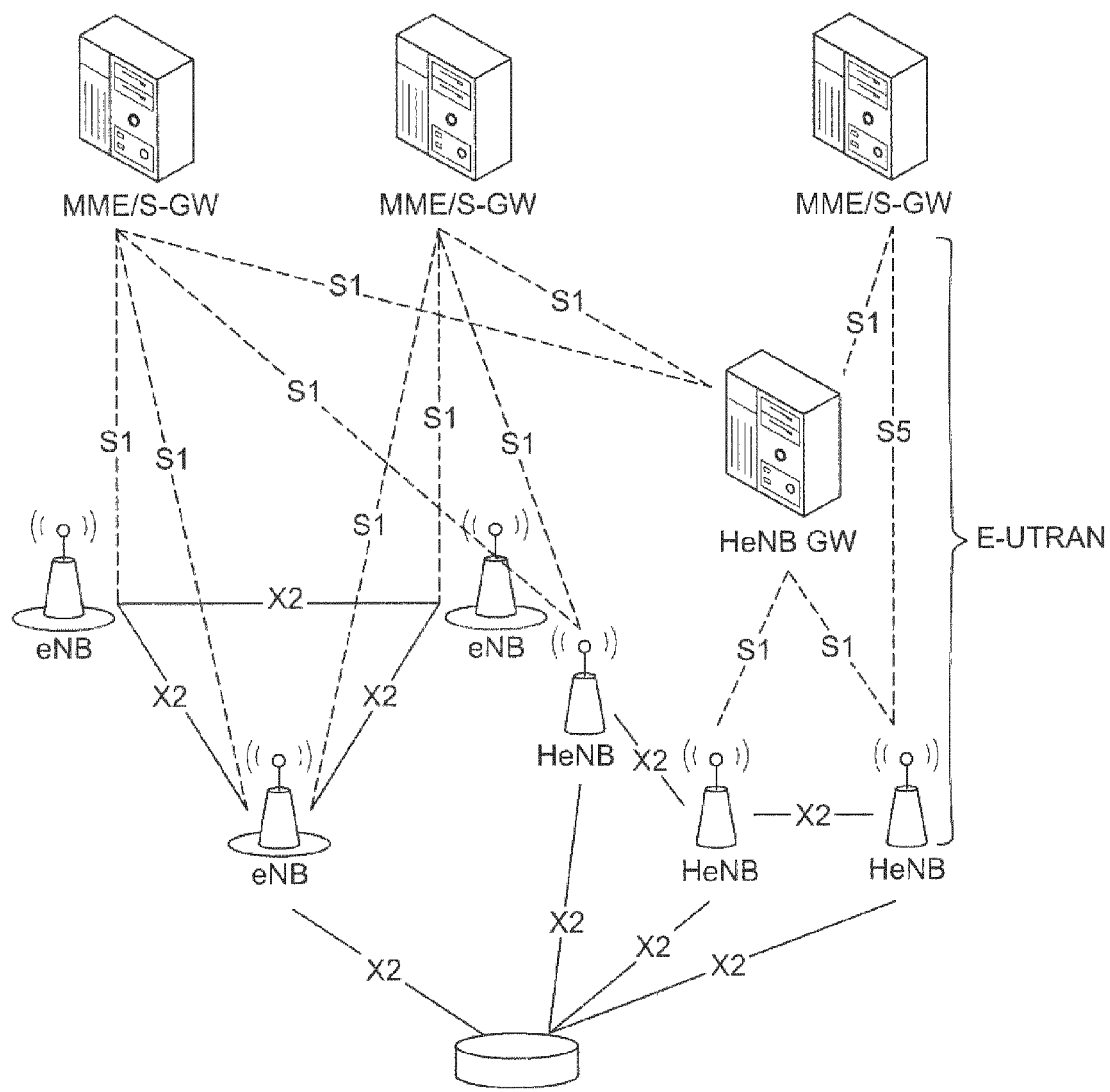
FIG. 3 illustrates an e-UTRAN architecture where a proxy router of the invention allows X2AP association between eNB and HeNB.

FIG. 3 represents an e-UTRAN interface network between eNBs and HeNBs. The network architecture of FIG. 3 is similar to the architecture of FIG. 2, but a proxy router allows X2 associations between a set of eNBs and HeNBs. The proxy router PR is able to establish SCTP connections with each evolved node both the eNBs and the HeNBs.

Figure 4:
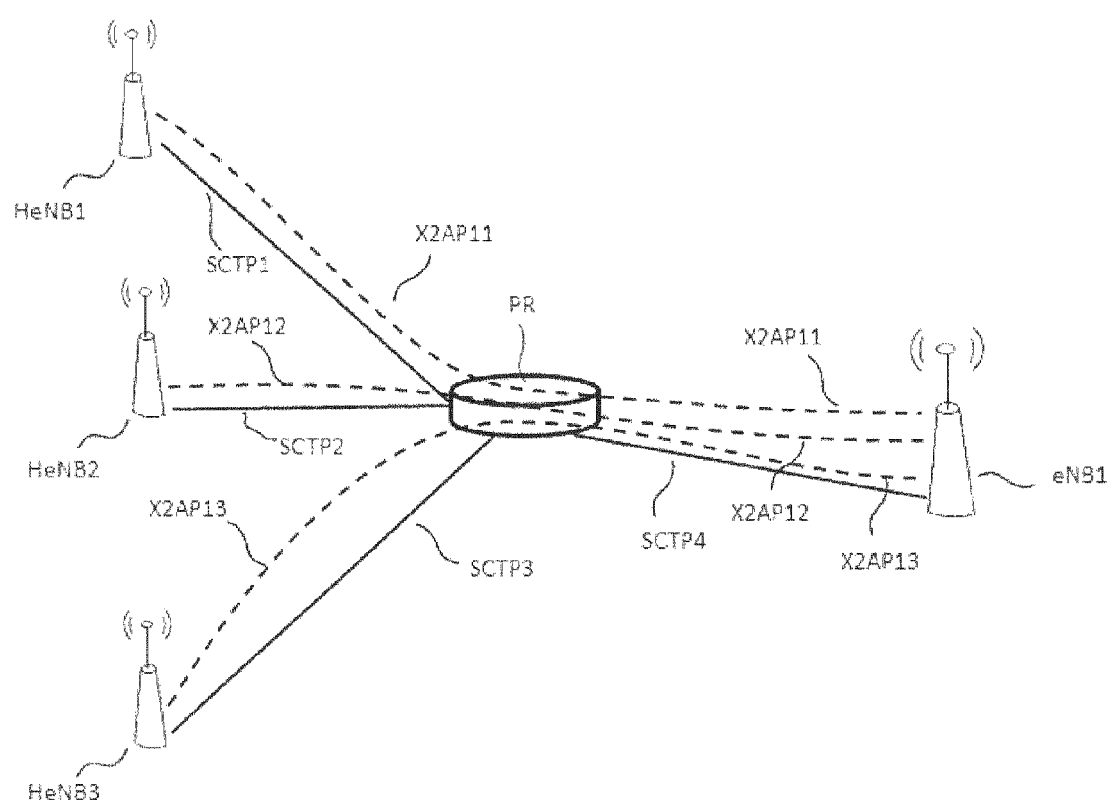
FIG. 4 illustrates an e-UTRAN architecture where a proxy router of the invention allows managing the switching off of an HeNB with other equipment.

FIG. 4 focuses on PR interfaces with eNB and HeNB.

The proxy router PR allows different SCTP connections with a plurality of HeNB. In the FIG. 4 these connections are noted:

SCTP1 when a connection is established between a first HeNB, noted HeNB1, and the proxy router PR;

SCTP2 when a connection is established between a second HeNB, noted HeNB2, and the proxy router PR;

SCTP3 when a connection is established between a third HeNB, noted HeNB3, and the proxy router PR.

The proxy router PR also allows different SCTP connections with at least one eNB. In the FIG. 4 this connection is noted:

SCTP4 when a connection is established between a first eNB, noted eNB1, and the proxy router PR.

As it is described above the proxy router may have several connections with different eNBs of a set of evolved Node Bs. The FIG. 4 only aims to focus on one SCTP connection between an eNB and the proxy router.

In this configuration the proxy router PR is able to support at least one X2AP association between each HeNB with an eNB.

In the FIG. 4 these associations are noted:

X2AP11 when an association is established between HeNB1 and the eNB1;

X2AP12 when an association is established between HeNB2 and the eNB1;

X2AP13 when an association is established between HeNB3 and the eNB1.

The method of the invention allows detecting SCTP disconnection between the proxy router and one HeNB in order to generate a X2AP STOP message to at least all eNBs having a X2AP association with the said disconnected HeNB.

As the eNB cannot detects the SCTP disconnection between the PR and the HeNB, the method of the invention provides a mean to inform the eNB of this disconnection.

This procedure enables stopping triggering X2AP messages in the network by the said associated eNBs, especially messages referred as X2AP class1 and class 2 procedures.

In a context of a HeNB disconnection, for instance the disconnection of HeNB1, a first step of the method of the invention is to generate a new X2AP message indicating to some eNBs of the network which have a X2AP association with said disconnected HeNB1 that the X2AP association is ended in order to stop triggering X2AP messages to that HeNB.

Concerning the generation of the X2AP STOP message, the invention comprises a first and a second embodiment.

In a first embodiment of the method of the invention, the proxy router is able to generate itself this X2AP STOP message. It means that the proxy router is able to detect a SCTP disconnection with the said disconnected HeNB1 and generate a X2AP STOP message to all concerned eNBs having at least an X2AP association with the said HeNB1. That message contains at least the source HeNB identifier.

In a second embodiment of the method of the invention, the X2AP STOP message is generated by the HeNB and transmitted to the proxy router which is able to store the said X2AP stop message for a later use, i.e. when the SCTP connection will be disconnected. One advantage of this solution is that the HeNB have all X2AP stacks and procedures to generate such a message. The HeNB is fully terminating X2AP protocol and this solution benefits from that termination.

In that embodiment, the X2AP STOP message still comprises the source HeNB ID.

The X2AP STOP message may be included in the form of a transparent container which is a new information element included in the X2 Setup Request/Response sent as a first X2AP message by an HeNB.

For each X2AP Setup Request/Response message sent by the HeNB, the proxy router may store the received container, plus the source IP address of the HeNB.

In an alternative embodiment, the proxy router may store the IP address of the target eNB corresponding to the received X2 Setup Request/Response and the source IP address of the HeNB in order to build a list of IP addresses of target eNBs with which the source HeNB has an X2AP association.

Figure 5:
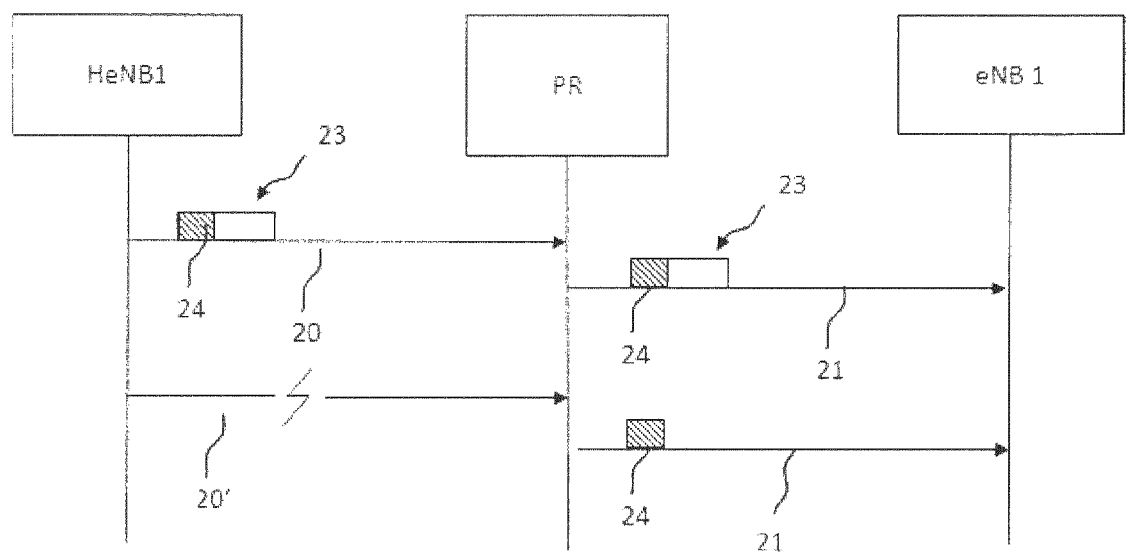
FIG. 5 illustrates an exchanging messages sequence between a HeNB, a proxy router and an eNB for dynamic management of a HeNB ON/OFF state.

The X2AP associated eNB with the HeNB, as a eNB1 in FIG. 4 or 5, may ignore that container. Indeed, the generated container only aims to be transmitted later when a SCTP disconnection between the HeNB1 and the proxy router will occur.

A second step of the method of the invention is to transmit the X2AP STOP message indicating the switching off of HeNB1 to a set of eNBs of the network which have each at least one SCTP connection with the proxy router.

Concerning the transmission of the X2AP STOP message towards some eNBs, the invention comprises a first and a second embodiment which can be combined with the previous described embodiments In a first embodiment, at any given point in time, the proxy therefore has in memory for each HeNB IP address, a first list of IP addresses corresponding to the eNBs with which the HeNB has setup an X2AP association.

In a second embodiment, the proxy router has in memory for each HeNB IP address, a second list of IP addresses corresponding to the eNBs which have a SCTP connection with the proxy router. One advantage is that the list can be unique in the proxy router for all HeNB. The list can be established by analysing all SCTP connections which are active in the router. This solution has the advantage of building a list already constituted in the router for another purpose.

In that alternative, the notion of X2AP association is completely unknown from the proxy router point of view. This is an advantage because it avoids any X2AP knowledge at all on the proxy router. In that solution, the proxy router only transmits a container without any knowledge about X2AP protocol when SCTP1 is disconnected. The container comprises the X2AP STOP message which can be analysed by a target eNB.

Whenever the proxy detects that a connected HeNB is switching off, for instance by losing the SCTP connection, the proxy sends the container earlier received from that HeNB, i.e. in the X2 setup sequence, towards all connected eNBs which have an IP address contained in the first or the second list above-defined.

After receiving an X2AP STOP message which comprises an HeNB ID, an eNB becomes aware that this particular HeNB has now switched off. That information allows eNB stopping triggering any more X2AP activity with that HeNB.

According to the invention the proxy only needs to store for each HeNB one list, i.e. the first or the second list depending of the embodiment chosen. The list may comprise the target IP addresses of a set of eNBs plus one container in order to send only to interested eNB, i.e. having an X2AP association with the disconnected HeNB.

Hence the problem is solved while maintaining the proxy not fully terminating X2AP protocol, not generating X2AP messages. One advantage is that the proxy router does not store and maintain X2AP contexts. This advantage also permits to deploy proxy routers more interoperable in one existing network.

The FIG. 5 illustrates the embodiment where the container 24 is sent by HeNB1 in a X2 setup sequence 23 when establishing an X2AP association with an eNB1 through the proxy router PR. The X2AP association is supported via a fist SCTP connection 20 and a second SCTP connection 21. The first and the second SCTP connections are independent due to the SCTP protocol features.

The setup sequence is a X2 setup request/response and it generally comprises a source HeNB1 ID, a target eNB1 ID and others information concerning setup configuration. In this embodiment, it also comprises a container including a X2AP STOP message.

As it is illustrated in FIG. 5, the setup request/response 23 is forwarded by the PR to the eNB1 via X2AP association.

In one embodiment, the forwarded setup request/response 23 can include the container 24. In that embodiment, the eNB1 receiving the setup information from HeNB1 can ignore the container in that context.

In another embodiment, the forwarded setup request/response 23 does not include the container 24. In that embodiment, the eNB1 receiving the setup information from HeNB1 does not receive the container. In that case the proxy router is able to store the container and remove it from the setup request/response data 23.

In both previous embodiments, the generated X2 STOP message from the HeNB1 only aims to be stored by the proxy router PR in order to send it for a later use, i.e. when the HeNB1 will be switched off.

The proxy router PR stores for this HeNB IP address the container. In a specific embodiment, the target IP address of the target eNB1 is stored with corresponding HeNB IP address from X2AP association. These information can be stored as a list as described above.

When the HeNB1 is switched off or is disconnected from the network, the SCTP connection 20 between the HeNB1 and the PR is disconnected, referring to context 20' on the FIG. 5.

In that case, the proxy router detects the absence of the HeNB1 and transmits only the container 24, without the setup sequence 23, through the SCTP connection 21 to the eNB1.

One advantage is that the proxy router does not need to know the X2AP context of both eNB1 and HeNB1.

Figure 6:
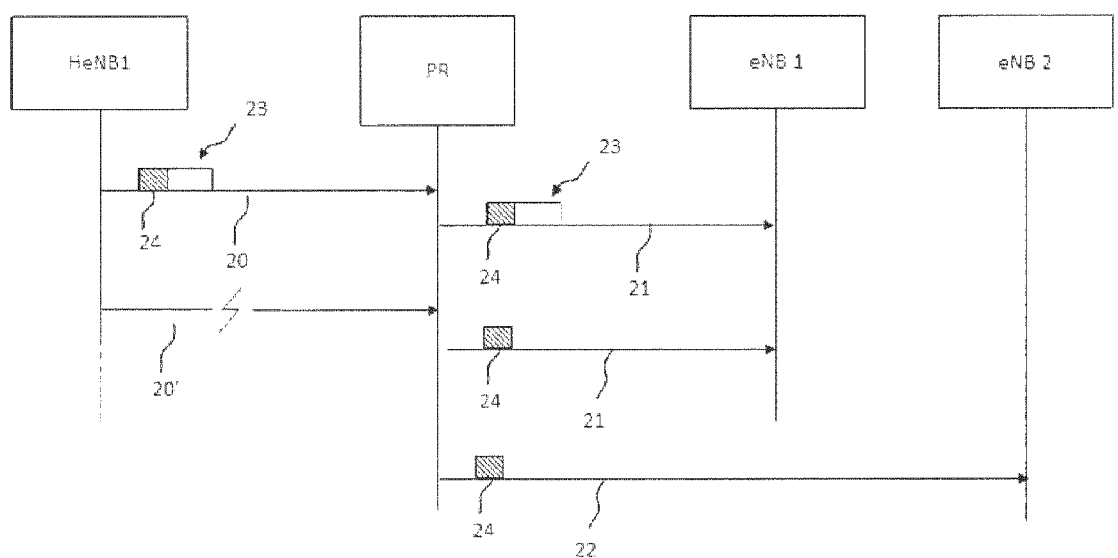
FIG. 6 illustrates an exchanging messages sequence between a proxy and several eNB for dynamic management of a HeNB ON/OFF state.

FIG. 6 illustrates one case where several eNBs, referred to eNB1 and eNB2 on FIG. 6, are connected via SCTP connection to the proxy router.

When the proxy router PR detects the disconnection of HeNB1, it retrieves the HeNB1 container in the stored list and sends the container to all eNB IP addresses of the list.

In one embodiment described above, the list corresponds to all eNBs having an SCTP connection with the proxy router. It means that if eNB1 and eNB2 have a SCTP connection, respectively 21 and 22, the proxy router will send the container 24 to each of them when disconnection of HeNB1 occurs.

One advantage of the solution of the invention is to improve network characteristics in term of decreasing congestion consequences and data rate optimization.

The invention claimed is:

1. A method for managing an ON/OFF status of a evolved Node B performed by at least a proxy router of a LTE telecommunication network comprising at least a first evolved node B and a second evolved node B of a set of evolved nodes B, the first evolved node B being connected to the proxy router via a first Stream Control Transmission Protocol (SCTP) connection and at least the second evolved node B of the set of nodes B being connected to the proxy router via a second SCTP connection, the proxy router allowing a first X2 Application Protocol (X2AP) association between the first and the second evolved nodes B, wherein the method comprises:
    detecting by at the proxy router any disconnection of the first SCTP connection of the first evolved node B with the proxy router;
    transmitting at least a X2AP STOP message indicating the disconnection of the first SCTP connection by the proxy router to evolved nodes B of the set of evolved nodes B being connected to the proxy router via an SCTP connection, the X2AP STOP message comprising data:
indicating the end of an X2AP association;
identifying the first evolved node B.

2. The method according to claim 1, wherein the evolved nodes B of the set of evolved nodes B that are connected to the proxy router via a SCTP connection perform the method, when receiving a X2AP STOP message from the proxy router,
stop triggering X2AP messages to the disconnected first evolved node B.

3. The method according to claim 1, wherein the proxy router stores a correspondence table between the IP address of the first evolved node B, the IP address being known by the first SCTP connection and a list of IP addresses of evolved nodes B of the set of evolved nodes B having an X2AP association with the first evolved node B via the proxy router.

4. The method according to claim 1, wherein the first evolved node B transmitting a X2AP STOP message included in a first container of a X2 setup sequence when a X2AP link is initiated between the first evolved node B and the second evolved node B.

5. The method according to claim 4, wherein the first container is stored in a memory of the proxy router and indexed to the correspondence table with the IP address of the first evolved node B when forwarding the setup sequence to the second evolved node B.

6. The method according to claim 4, wherein the proxy router automatically transmits the first container to at least the second evolved node B of the set of nodes base when detecting the disconnection of the first SCTP connection with the first evolved node B.

7. The method according to claim 1, wherein the first evolved node B is a low power cellular base station having one cell.

8. The method according to claim 7, wherein the first evolved node B is a home evolved node B.

9. The method according to claim 1, wherein the evolved nodes B of the set of evolved nodes B are Home evolved node B.

10. A proxy router connected in a LTE telecommunication network comprising at least a first evolved node B and a second evolved node B of a set of evolved nodes B, the first evolved node B being connected to the proxy router via a first Stream Control Transmission Protocol (SCTP) connection and at least the second evolved node B of the set of evolved nodes B being connected to the proxy router via a second SCTP connection, the proxy router comprising:
a processor and memory, wherein the processor is configured to allow a X2 Application Protocol (X2AP) association between the first and the second evolved nodes B, wherein the processor is configured to:
detect disconnection of the first SCTP connection with the first evolved node B;
transmit a X2AP message indicating the disconnection of the first SCTP connection, noted X2AP STOP message, to the second evolved node B, the X2AP STOP message comprising data:
indicating the end of the SCTP connection;
identifying the first evolved node B.

11. The proxy router according to claim 10, wherein the proxy router automatically transmits the X2AP STOP message to at least the second evolved node B of the set of nodes base when detecting the disconnection of the first SCTP connection with the first evolved node B.

* * * * *